United States Patent [19]
Clouston

[11] 3,762,456
[45] Oct. 2, 1973

[54] TWO-PART AUTOMOTIVE TIRE CHAIN

[76] Inventor: John L. Clouston, 504 9th Ave. W., Kalispell, Mont. 59901

[22] Filed: Dec. 15, 1971

[21] Appl. No.: 208,183

[52] U.S. Cl. .............................. 152/213 A, 152/241
[51] Int. Cl. ............................................ B60c 27/10
[58] Field of Search ........................ 152/241, 213 A

[56] References Cited
UNITED STATES PATENTS
1,989,217  1/1935  Sisk................................. 152/213 A
3,025,901  3/1962  Bengert............................... 152/241

Primary Examiner—James B. Marbert
Attorney—James D. Givnan, Jr.

[57] ABSTRACT

A tire chain comprising two separate parts with each of said parts including a semi-rigid wire member of substantially semi-circular shape for placement against the inside sidewall of the tire. The wire member of the first chain part terminating in hooked end portions for the adjustable reception of chain lengths carried at the ends of the remaining wire member of the other chain part. Swingably affixed to the wire members are the ends of cross chain segments disposed in an evenly spaced manner along both of said wire members with the cross chains extending over the tire tread. Extending along the outer sidewall of the tire are semi-circular lengths of tire chain which coact to secure the outer ends of the cross chain segments firmly about the tire tread. An elastic cord is temporarily engageable with the ends of the first mounted chain part and with the wheel rim to retain said chain part in place during partial wheel rotation whereupon the remaining chain part is applied. Attachment of the two chain parts on the inner side of the wheel assembly is greatly facilitated by the simple engagement of a chain link over a stationary hooked end of a semi-circular wire member. The elastic cord may be reapplied intermediate the chains parts in the manner of a chain tightener.

1 Claim, 5 Drawing Figures

PATENTED OCT 2 1973 3,762,456

INVENTOR
JOHN L. CLOUSTON
BY
AGENT

TWO-PART AUTOMOTIVE TIRE CHAIN

BACKGROUND OF THE INVENTION

The present invention is concerned with tire chains as applied to the driving wheels of a vehicle for increasing tire traction over snow and ice. Such chains commonly include cross chain segments circumferentially spaced about the tire periphery for ground contact and which segments are joined by longer side chain lengths extending adjacent the tire sidewalls.

Considerable effort is required in the application of existing tire chains to automotive tires and particularly to those of a passenger auto. The task includes either placement of the conventional one-piece chain over a tire jacked up off the ground or alternatively the backing of the auto into place on chains set in place along the ground after which the chain ends are brought into latched engagement. Mounting of conventional one-piece tire chains via either of the above methods requires from 20 to 30 minutes for a typical motorist who may apply tire chains but a half dozen or so times a year.

Of greater concern than the time element is the inconvenience and degree of danger encountered in the mounting of tire chains. Mounting commonly takes place on a snow or ice covered roadway and entails working on one's hands and knees or even lying in the snow in order to secure latching of the chain ends. Those chain ends located adjacent the inside sidewall of the tire are particularly troublesome to latch. Not infrequently individuals beneath autos are injured while in the act of applying tire chains by automobiles slipping off jacks.

What has been stated above with regard to the mounting of chains is also true to a large extent for the removal of tire chains. The over center type latch utilized on many makes of tire chains is difficult to open and close with encrusted snow and ice adding to the difficulty. Further, a small degree of slack in the chain is of course necessary to unlatching, which slack must be provided by exerting pulling force on the chain. Further, the opening and closing of the latching element, located against the inside sidewall of the tire, must either be accomplished in a "blind" manner or, alternatively, entails lying on one's back with head and shoulders inwardly of the auto's rear wheel which is not only highly inconvenient but in some instances incurs risk of injury.

A further problem with conventional tire chains is the fact that a tire chain accomodates but a very limited number of tire sizes hence requiring the purchase of new tire chains upon the user acquiring another auto.

Additionally the prior art, of which I am aware, discloses other types of tire chains, some of which are segmented into multiple tire chains which for various reasons have not met with wide public acceptance. A detrimental aspect to the latter type chains is the use of rigid, arcuate members of considerable weight and restricted to use with a specific wheel diameter.

SUMMARY OF THE INVENTION

The present invention is embodied within a tire chain comprising two parts, each part being similar in that they include shaped, semi-rigid wire members and chain links with said members serving to pre-dispose the chain parts to facilitate placement onto the tire.

A first part of the present chain is attached to the upper half of an automobile wheel with an elastic cord holding said half securely in place during subsequent partial wheel rotation and during application of the remaining part of the chain. Highly advantageous is the provision of semi-rigid wire components which facilitate the attachment of each chain part into position against the inner sidewall of the tire. One of said semi-rigid components includes hooked ends which receive chain links carried at the corresponding ends of the other semi-rigid member which simplifies greatly the inside attachment (adjacent the inner sidewall of the tire) of the two-part chain. The chain links, on the other wire component, are simply hooked over the stationary hooked ends of the other parts semi-rigid member. This task is easily accomplished in the blind by touch alone. The insertion of an end link within a latch mechanism is accordingly avoided as is the arduous task of swinging the latch closed and sliding the customary locking means over the latch ends.

The outer (with respect to the wheel assembly) counterpart of the semi-rigid wire members are side lengths of chain with each length adapted to lie in semi-circular disposition against the sidewall of the tire. Depending from the ends of one chain length are short chain segments for hooked attachment with hook elements affixed to the opposing ends of the other semi-circular chain. Again, the hook elements are securely held in place to greatly facilitate engagement of same with the link desired. Upon completion of the mounting, the elastic cord, above mentioned, is re-applied to the mounted tire chain to serve as a chain tightening device.

An important object of the present invention is the provision of a tire chain, of two-part construction, for application to an automobile tire without the necessity of lifting of the tire from the ground surface or, alternatively, without the necessity of draping a length of continuous chain about the tire circumference. Either of the aforementioned methods of conventional tire chain application is time consuming, inconvenient and often dangerous.

A further object is the provision of providing attachment means along the inner sidewall of the tire which may be easily fastened in an unseen, one-handed manner by touch alone, hence it is only necessary to reach behind the tire as opposed to crawling beneath same.

An additionally important feature of the present tire chain is cost of manufacture which will reflect a reduction in cost by reason of the instant tire chain incorporating semi-rigid wire members in place of more costly chain lengths.

BRIEF DESCRIPTION OF THE DRAWINGS

With attention to the accompanying drawings.

DESCRIPTION OF THE PREFERRED EMBODIMENTS

Figures 1, 2, 3, 4, 5:
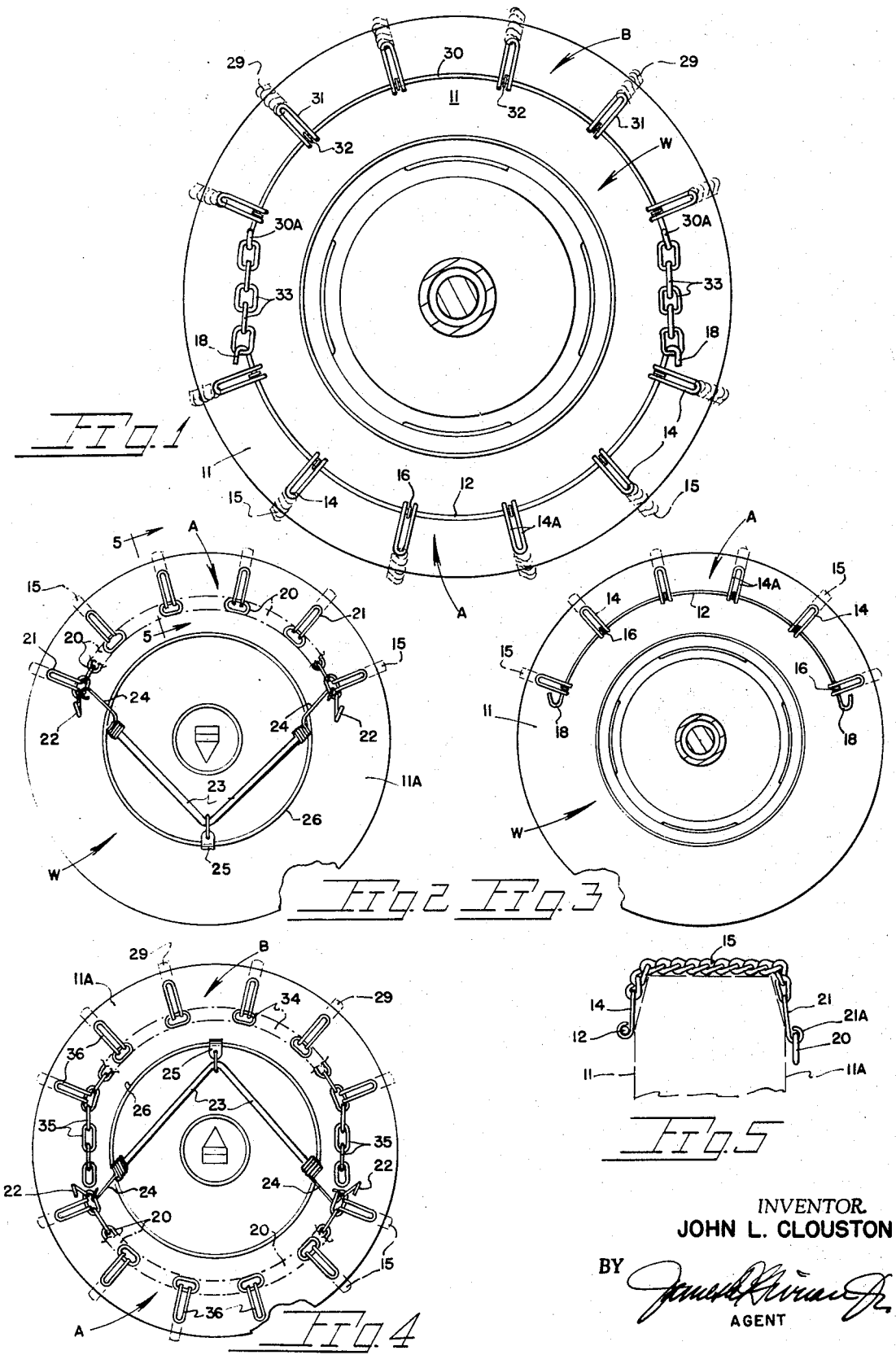
FIG. 1 is an elevational view of the inward side of a vehicle wheel assembly with the instant chain mounted thereon.
FIG. 2 is a side elevational view of the outwardly facing side of the vehicle wheel with a first chain part mounted thereon.
FIG. 3 is a view similar to FIG. 1 with only the first chain part mounted thereon.
FIG. 4 is a view similar to FIG. 2 with both chain parts in place on the wheel assembly but unattached for convenience of illustration.
FIG. 5 is a sectional view taken along line 5 — 5 of FIG. 2 and showing a typical cross chain component terminating in attachment to a semi-rigid wire member and a length of side chain.

With continuing reference to the accompanying drawings wherein applied reference characters and numerals indicate parts similarly identified in the following specification, the reference numerals A and B indicate generally first and second parts of the instant two-part tire chain. The chain parts are applied about the tire with part A being initially applied as seen in FIGS. 2 and 3 with part B being applied subsequent to partial rotation of the wheel assembly indicated generally at W and including a metal wheel. Details of the wheel and axle assembly are of no importance to an understanding of the invention and hence are dispensed with. The following description is of the present invention in place on a vehicle tire. Since the parts must be applied in sequence said parts A and B are preferably color coded for ease of identification on their non-ground contacting components.

With particular reference to part A (also referred to later as the first chain part) a semi-rigid length of wire at 12 in FIGS. 1 and 3, extends along a semi-circular segment of the tire sidewall indicated at 11. Said length of wire is pre-shaped to substantially correspond to the medial radius of the sidewall which will vary somewhat with different tire sizes. In spaced relationship along the wire member 12 are end links 14 of cross chains 15. Each end link 14 is retained against movement along the wire member 13 by a retainer 16 which may be in the form of an ear, weld or other suitable means which will permit necessary swinging motion of the end links during flexing of the tire sidewall. Alternatively, such retention may be provided for by deforming of the wire member intermediate the leg portions 14A of each end link. As shown in FIGS. 1 and 3 the ends of wire member 12 terminate in hook shaped end portions 18.

With attention directed to FIG. 2 wherein the remainder of part A is shown, a side length of chain is indicated at 20, corresponding generally in length to semi-rigid wire element 12. End links at 21 for the cross chains 15 are attached in place by means of their lower extremities 21A (FIG. 5) passing outwardly through a side chain link and being closed thereabout. Permanently secured to the ends of chain length 20 in a movable manner are attachment links 22 closed at one end about their adjacent chain link and open at their outer ends to constitute hooks.

With continuing reference to FIG. 2 an elastic cord is indicated at 23 for use in temporarily securing part A in place on the vehicle tire as shown. The cord 23 is fitted with hook elements 24 for engagement with the end links of chain length 20 to bias same inwardly thus securing part A in place. A clip 25 carried by the cord is shaped so as to retentively engage the metal wheel rim 26 with resultant tensioning of the cord. Importantly the attachment links 22 are left in a swingably attached manner.

The placement of part A upon the tire is greatly facilitated by the semi-rigid wire member which serves to pre-shape the part A to the tire segment. The ends of wire member 12 are grasped and placed over and behind the tire. Fender clearance is adequate to accomplish same without jacking of the auto body. Part A is accordingly placed, as shown in FIG. 2 by the steps of lifting the wire member 12 over and into place along the inner sidewall of the tire. The second step entails attachment of elastic cord 23 to the wheel rim 26 and the ends of outwardly located chain length 20. The latter is best accomplished with clip insertion on the rim being done after attachment of the cord ends.

Prior to attachment of part B the automobile is moved to rotate the wheel and tire assembly one-half revolution whereat part A is now as shown in FIGS. 1 and 4.

Part B, in similarity to part A, includes a semi-rigid wire member at 30 as best seen in FIG. 1. Cross chains 29 are secured by links at 31 along wire member 30 by retainers 32 or equivalent means earlier noted. Carried at each end of semi-circular wire member 30 are short lengths of chain 33 which constitute adjustable attachment means, with the attached end of said short lengths being permanently secured within closed ends 30A of the wire member. Attachment of wire members 12 and 30 of parts A and B entails only the simplified hooking of a link 33 over the now downwardly directed hook ends 18 of the part A wire member. Obviously, a tire of lesser size than that shown in FIG. 1 would be accomodated by the fastening of one of the intermediate links 33.

With attention again to chain part B (later referred to also as the second chain part) an outside length of side chain 34 extends, in semi-circular fashion, along the outer sidewall of the tire indicated at 11A. Cross chains 29 terminate in end links 36 carried by side chain length 34 with said end links being turned outwardly at their inner ends for permanent attachment through the links of side chain as similarly described in connection with part A. Loosely depending from the length of chain 34 are short segments 35 of attachment links which depend, during chain mounting, in close proximity to the attachment links 22 of part A. The engagement of the last mentioned links to one of the links 35 completes the coupling of part B to part A and is accomplished with a downward pull being exerted on the two link segments 35. The elastic cord 23 is, at this point, detached both from the tire rim 26 and from hooked engagement with part A and thence, if desired, is reattached diametrically in the manner of a conventional elastic chain tightener. Additional elastic cords may be applied between the side chain lengths 20, 34 to further tighten the two-part chain about the tire although it is to be understood that in some tire applications chain tightening cords will not be required.

The application of the two parts A and B of the present chain to a tire are believed apparent from the foregoing description wherein the necessary steps have been set forth in conjunction with structure to aid in an understanding of the invention. Removal of the tire chain is accomplished simply by initial removal of any chain tightening cords to used. With the tire located so as to position part A lowermost the attachment links 22 are disengaged from links 35. With reference to FIG. 1 detachment of the inwardly disposed hooks 18 and links 33 is accomplished rapidly in a "blind," one-handed manner by reason of the slack provided by the unfastened side chain length 34. Part B of the chain (during removal) is slid upwardly and over the upper segment of the tire. Part A at this point is free to fall to the ground surface whereupon the auto is driven forward off of part A.

While I have shown but one embodiment of the invention it will be apparent to those skilled in the art that the invention may be embodied still otherwise without departing from the spirit and scope of the invention.

Having thus described the invention what is desired to be secured under a Letters Patent is:

1. A two-part tire chain for sequential application of each part to the upper segment of a wheel assembly of a vehicle with intervening partial rotation of the wheel assembly during chain application, said chain comprising, first and second tire chain parts each of generally semi-circular complementary configuration when in place on a vehicle tire, said first and second parts each being separate and including a semi-rigid wire member of pre-formed generally arcuate shape for disposition adjacent the inner sidewall of a tire, the vehicle wheel assembly being partially rotated between application of said first and second parts to permit sequential placement of said parts on the upper segment of the tire, the wire member of said first chain part terminating at its ends in hook shaped end portions, the wire member of said second chain part having short lengths of chain attached to its ends for adjustable engagement with said hook shaped end portions of the other semi-rigid wire member, each of said lengths being manually tensionable prior to passage of a chain link thereof over a hooked shaped end portion of the other chain part for snug engagement of said chain parts, said first and second chain parts including side lengths of chain each for disposition in semicircular fashion along the outer sidewall of a tire, attachment means at the ends of said side lengths of chain for fastening the ends thereof to one another, cross chains extending intermediate said side lengths of chain and wire member of each chain part and passing over the tire tread, and an elastic cord having hook elements affixed to its ends for temporary engagement with the ends of the side length of chain of the first chain part, clip means medially disposed along said cord for temporary inserted engagement with the metal wheel rim for tensioning of the cord to exert an inwardly directed retaining force on said first chain part during partial wheel rotation prior to attachment of said second part of the chain.

* * * * *